United States Patent [19]
Hossfield et al.

[11] Patent Number: 5,684,597
[45] Date of Patent: *Nov. 4, 1997

[54] METHOD AND DEVICE FOR COIN DIAMETER DISCRIMINATION

[76] Inventors: Robin C. Hossfield, 6 Grace Ter., Medway, Mass. 02053; Christopher Ferguson, 35 Constitution St., Ashland, Mass. 01721; J. Scott Petty, 2557 Oxford La., NW. - Apt. 3, Cedar Rapids, Iowa 52405; Glenn W. Schwantes, 1730 Graber St., Oshkosh, Wis. 54901; William J. Quandt, 44 Highland Ave., Ripon, Wis. 54971

[*] Notice: The term of this patent shall not extend beyond the expiration date of Pat. No. 5,404,986.

[21] Appl. No.: 534,136

[22] Filed: Sep. 26, 1995

Related U.S. Application Data

[63] Continuation of Ser. No. 194,767, Feb. 10, 1994, abandoned.
[51] Int. Cl.⁶ .................. G01B 11/02; G07D 5/02
[52] U.S. Cl. .................. 356/384; 356/386; 194/317; 194/334; 194/343
[58] Field of Search .................. 356/384, 385, 356/386, 387; 250/223 R, 223 B, 231.14, 231.15, 233, 560, 561; 209/586–588, 875, 938, 524–525, 577–579, 659, 666; 194/317, 318, 334

[56] References Cited

U.S. PATENT DOCUMENTS

| | | | |
|---|---|---|---|
| 3,237,631 | 3/1966 | Kamei et al. | 194/334 |
| 3,699,981 | 10/1972 | Conant et al. | 194/334 |
| 3,870,137 | 3/1975 | Fougere | 194/317 |
| 3,939,954 | 2/1976 | Collins | 194/334 |
| 3,952,851 | 4/1976 | Fougere | 194/317 |
| 3,966,034 | 6/1976 | Heiman et al. | 194/318 |
| 4,234,071 | 11/1980 | Le-Hong | 194/317 |
| 4,267,916 | 5/1981 | Black et al. | 194/317 |
| 4,407,312 | 10/1983 | Davila et al. | 194/334 |
| 4,544,058 | 10/1985 | Choderker et al. | 194/334 |
| 4,585,936 | 4/1986 | Sellier | 194/334 |
| 4,646,904 | 3/1987 | Hoormann | 194/334 |
| 4,667,093 | 5/1987 | MacDonald | 356/386 |
| 5,030,165 | 7/1991 | Nilsson et al. | 194/334 |
| 5,195,626 | 3/1993 | Le-Hong et al. | 194/317 |
| 5,392,891 | 2/1995 | Ferguson et al. | 194/317 |
| 5,404,986 | 4/1995 | Hossfield et al. | 194/317 |

*Primary Examiner*—Hoa Q. Pham

[57] ABSTRACT

A coin diameter discriminating device wherein a coin is received in a coin transport mechanism which is rotated by a motor at an accurately controlled angular velocity. By such arrangement, the coin is carried along a predetermined path at an accurately controlled or regulated velocity past at least one optical sensor that provides a change of state output upon detecting an edge of the coin. The sensor is arranged to start a time counter that is stopped by a predetermined reference event such as the coin transport mechanism having rotated to a predetermined angular orientation. The time count in the counter therefore corresponds to the angular orientation of the coin transport mechanism at the time of detecting the coin edge, which also accurately corresponds to the diameter of the coin. The time count is then compared to corresponding time count ranges each of which relates to known standards of an acceptable coin denomination.

17 Claims, 8 Drawing Sheets

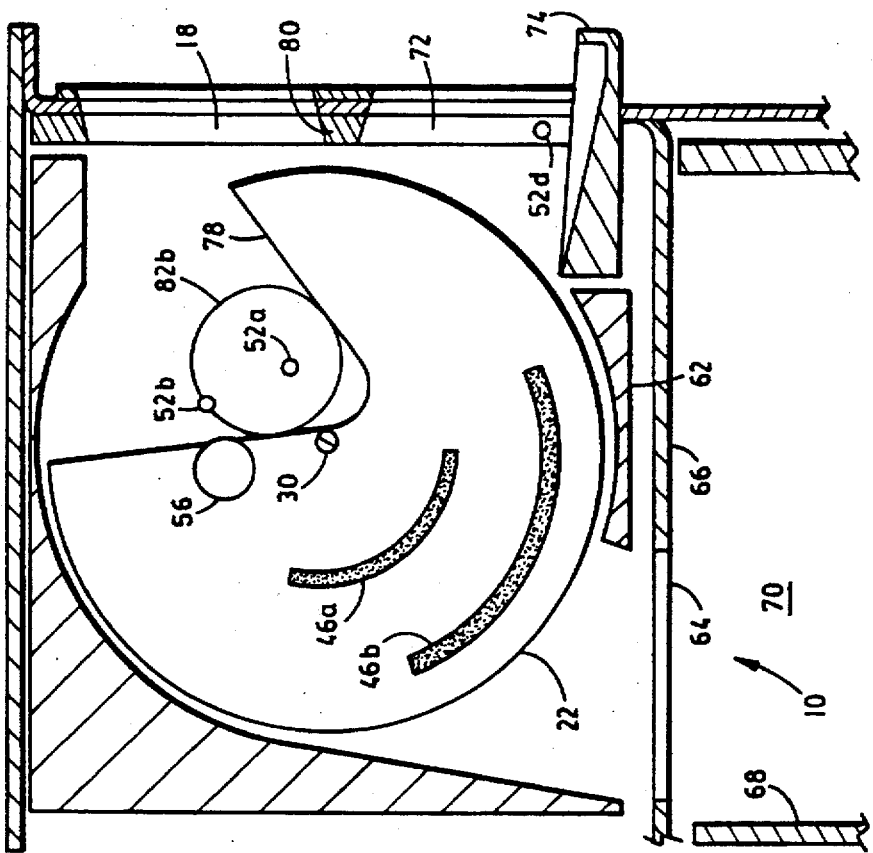
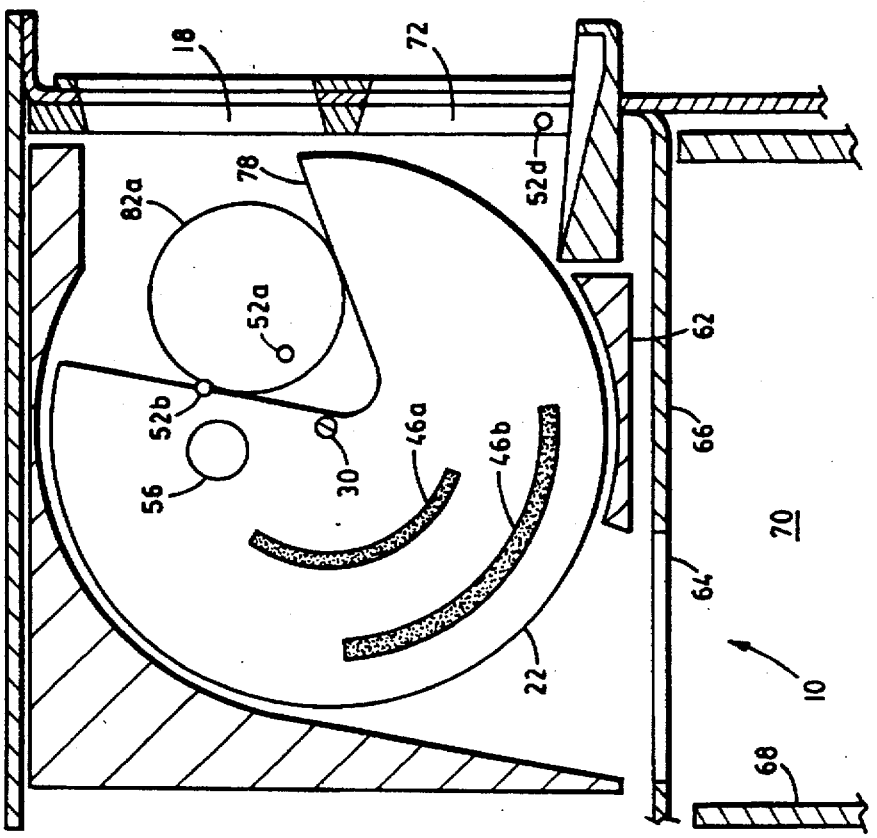

METHOD AND DEVICE FOR COIN DIAMETER DISCRIMINATION

This application is a continuation of application Ser. No. 08/194,767 filed Feb. 10, 1994 now abandoned.

BACKGROUND OF THE INVENTION

The field of the invention generally relates to coin operated devices, and more particularly relates to devices and methods used to discriminate coins based on their diameters.

As is well known, there are a variety of coin operated devices such as laundromat equipment, vending machines, toll booths, and public telephones. Generally, such devices identify a deposited coin or token by detecting coin characteristics or parameters, and comparing them to corresponding standards that are known for acceptable denominations of coins. For example, some of these parameters are coin diameter, thickness, ferrous or material content, and weight. Some of the more successful coin discrimination schemes employ a combination of parameters such as coin diameter discrimination combined with sensing the metal characteristics of the coin.

Typical prior art coin diameter discriminating devices employ some sensor to detect the passing of a rolling coin. For example, one or more optical sensors may be arranged along a ramp along which the coin rolls. The diameter is determined by measuring the time required for the coin to pass the sensors. In particular, if only one sensor is used, the device discriminates the diameter of a coin on the basis of the time during which light from an emitter to a photodetector is shielded by the coin rolling therebetween. It is apparent that when suitably arranged, a large coin will break the light beam for a longer period of time than a small coin. Measurements taken in this manner are generally effected by coin rolling velocity, which in turn can be effected by a variety of factors. For example, the coin or the ramp may be dirty or sticky, or may be contaminated by other friction altering substances. Further, the edge of one coin may be worn more than another. Also, the velocity of the coin may be effected by how the coin was inserted in the slot, or how it happens to be rolling against the sides of the ramp. Temperature may also change rolling conditions. As a result of the above and other variable factors, there may be significant inaccuracies in measurements relating to the size, and more particularly the diameter of coins.

One way to avoid the dependency of coin diameter measurements on velocity is to use an array of sensors that are vertically stacked, such that smaller coins pass through fewer sensors and larger coins pass through more sensors. However, with this approach, diameter resolution is limited by the number of sensors employed. The cost for attaining higher resolution may be prohibitive. Also, a coin may be bouncing in which case accuracy is greatly reduced.

SUMMARY OF THE INVENTION

In accordance with the invention, a coin diameter discriminating device comprises a transport mechanism for holding a received coin of unknown diameter. The transport mechanism is moved such as by rotation with a motor to move the coin along a predetermined path at an accurately controlled velocity. A sensor such as an optical sensor along the coin path detects the arrival of an edge of the coin, and apparatus responsive to the sensor produces an output signal in accordance with the size of the coin.

With such arrangement, prior art velocity variations are eliminated or greatly reduced because the coin no longer rolls freely past sensors under the influence of gravity. Rather, the coin is carried by a transport mechanism that is moved at an accurately controlled velocity by a motor, here described as a stepper motor with a speed reducer. The arrival of the coin edge, either leading or trailing, at the sensor is a function of the size, or more particularly the diameter, of the coin. Thus, the orientation, here described as angular orientation, of the transport mechanism at the time of edge arrival corresponds to the diameter of the coin. One simple way of providing an output signal corresponding to the angular orientation, and thus the diameter, is to start or stop an elapsed time counter when either the leading or trailing edge of the coin is detected, and then stop or start the counter at a predetermined event that is related to a reference orientation of the transport mechanism. For example, the counter can be stopped when the transport mechanism has rotated to a predetermined angular orientation. Thus, the time count corresponds to an angle of rotation from or to a reference. Here, the time count corresponds to the angular orientation when the coin arrived at the sensor, which in turn corresponds to the diameter of the coin. There is no need to convert the time count to a diameter; it can be compared with ranges of similar or corresponding time counts derived using known coins wherein each range corresponds to a different coin denomination.

The invention may also be practiced by a coin diameter discriminating device comprising a light transmissive disk having a notch adapted to receive a coin of unknown diameter, and first and second stationary plates disposed on opposite sides of the disk. At least one light emitter is disposed on the first plate and a corresponding aligned photodetector is disposed on the second plate. A stepper motor operating through a speed reducer provides accurately regulated rotation of the disk between the stationary first and second plates to carry the coin at an accurately regulated velocity in an arcuate path between the light emitter and the photodetector. A time counter is initiated by a change in state of the photodetector in response to the coin passing between the light emitter and the photodetector. Means responsive to a predetermined event such as the arrival of the disk at a predetermined angular orientation is used to stop the time counter thereby producing a count in accordance with the diameter of the coin.

BRIEF DESCRIPTION OF THE DRAWINGS

The foregoing objects and advantages will be more fully understood by reading the following Description of the Preferred Embodiment with reference to the drawings wherein:

FIGS. 6A and 6B show angular rotations of the disk for two different denominations of coins, respectively;

DESCRIPTION OF THE PREFERRED EMBODIMENT

Figure 2:
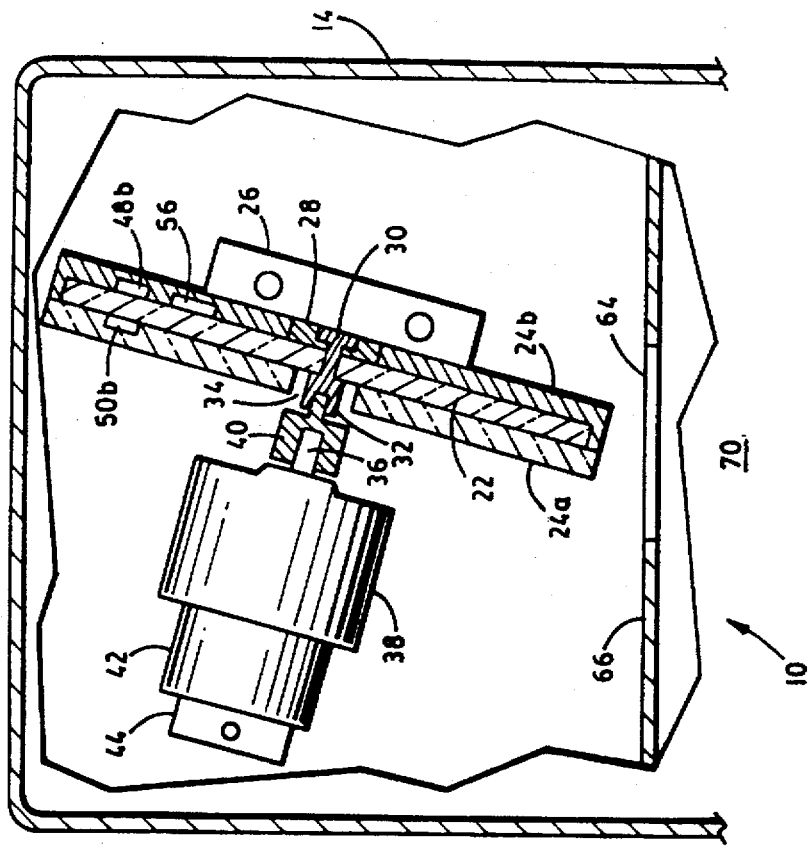
FIG. 2 is a front view of the coin transport mechanism of FIG. 1.
Figure 1:
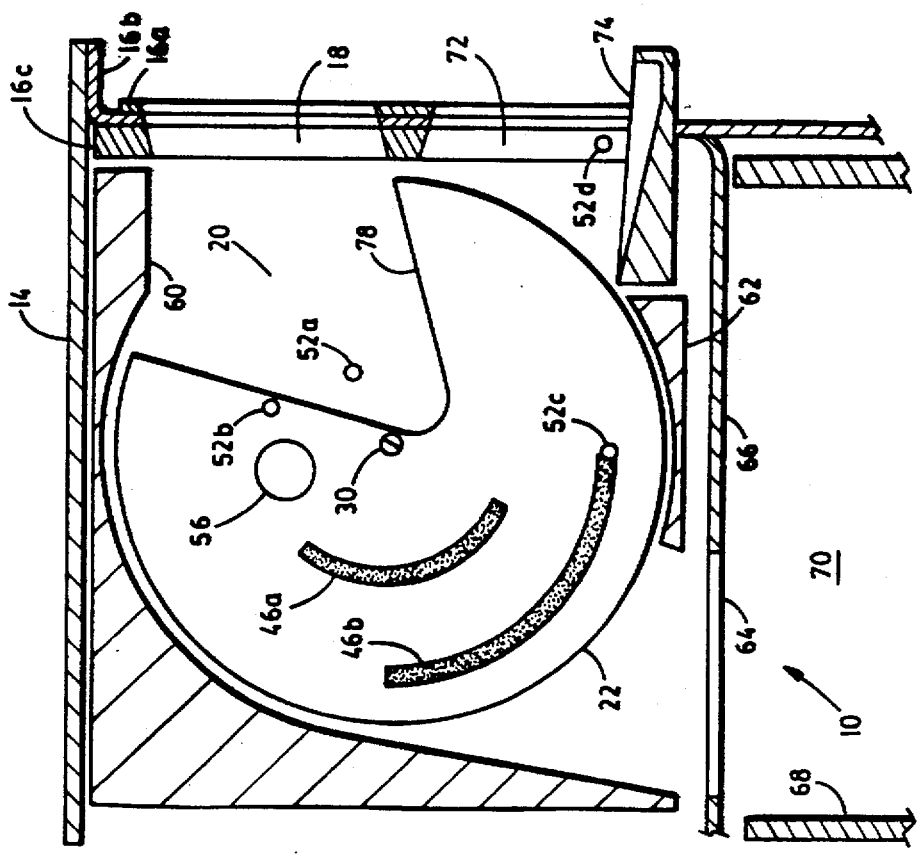
FIG. 1 is a partially sectioned side view of a coin transport mechanism.
Figure 3:
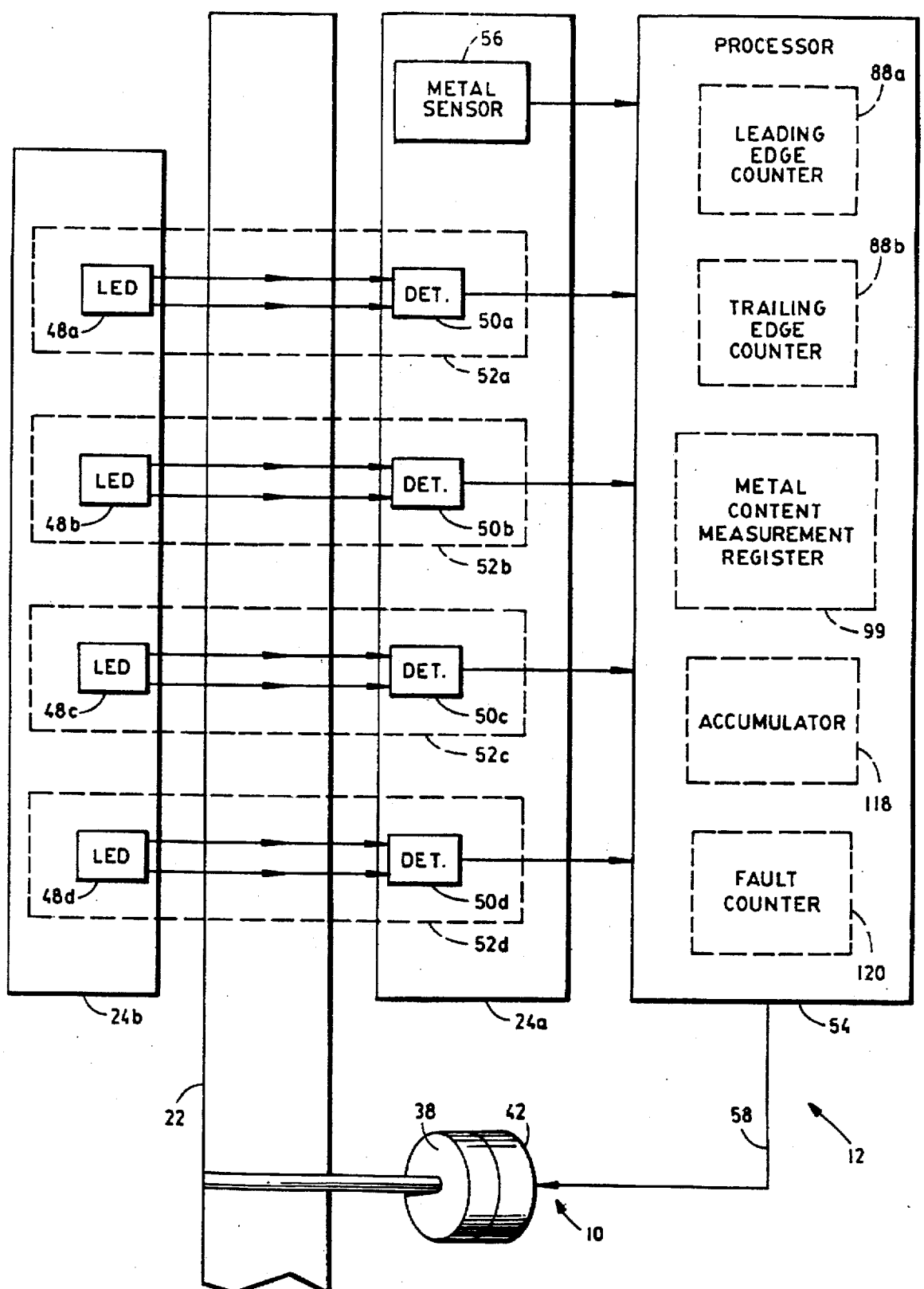
FIG. 3 is a simplified block diagram of a coin discrimination and collection system utilizing the coin transport mechanism of FIG. 1.

Referring to FIGS. 1 and 2, a coin transport mechanism 10 is adapted for use in a coin discrimination and collection system 12 as shown in FIG. 3. Coin transport mechanism 10 is here mounted within a security housing 14 such as would be used with coin operated laundry equipment. However, those of skill in the art will recognize that the coin discrimination and collection system 12 could be used in a variety of other applications such as vending machines, toll booths, and public telephones. Housing 14 here has front panel members 16a-c which form a coin slot 18 disposed at a suitable angle or tilt to align with a coin cavity or notch 20 in wheel or disk 22 which is at an angle as shown in FIG. 2. Disk 22 is sandwiched between upper and lower side plates 24a and b which are mounted in a stationary manner such as by bracket 26. A bearing 28 is mounted in lower side plate 24b and rotatably secures a shaft 30 which extends through and is secured to disk 22. The upper end 32 of shaft 30 extends through an aperture 34 in upper plate 24a and is connected to output shaft 36 of speed reducer 38 by a suitable coupling 40. Speed reducer 38 is driven by motor 42 which is suitably mounted such as by bracket 44. In operation in a manner to be described, actuation of motor 42 drives speed reducer 38 which rotates wheel or disk 22 and causes coin cavity or notch 20 to rotate about shaft 30 between stationary plates 24a and b. Coin notch 20 is rotated at a uniform angular velocity. In particular, uniform velocity is here provided by using a DC stepping motor 42 and pulsing at a high rate, here 600 pulses per second. With a relatively slow pulse rate, a stepper motor may start and stop thus resulting in ripple velocity. However, with a relatively high pulse rate such as 600 pulses per second, velocity ripple becomes negligible, and substantially constant velocity is attained. Here, a 30:1 speed reducer 38 is used to reduce the output speed of motor 42, so the 1800 RPM of the motor 42 is reduced to 60 RPM. Thus, for each pulse, disk 22 moves 0.6°.

Referring specifically to FIG. 1, wheel or disk 22 has inner and outer arcuate markers or masks 46a and b that have predetermined arcuate lengths and radial distances to control the operation of the coin transport mechanism 10 in a manner to be described later herein. Referring also to FIGS. 2 and 3, lower plate 24b has four embedded light emitting devices, here LEDs 48a-d, which are disposed opposite corresponding light sensitive devices, here detectors 50a-d, that collectively form light sensors 52a-d. Even though upper and lower plates 24a and b are omitted from FIG. 1 for simplicity of illustration, the location of light sensors 52a-c and metal detector 56 which are embedded therein are shown. The locations of light sensors 52a-d will be discussed later herein with reference to the operation of coin transport mechanism 10. Each detector 50a-d has an output coupled to processor 54. A conventional metal sensor 56 such as described in U.S. Pat. No. 3,966,034 is also embedded in lower plate 24a, and has an output coupled to processor 54. Lower plate 24b in which metal sensor 56 is embedded is preferably a low friction material such as polystyrene. If plate 24b is metal, a plastic donut (not shown) preferably encases metal sensor 56 to avoid interference with the alternating field emanating therefrom. Processor 54 has an output 58 which provides high frequency pulses such as 600 pulses per second to motor 42 in accordance with operation to be described.

Still referring to FIG. 1, an upper guide 60 and a lower guide 62 have arcuate surfaces disposed adjacent to disk 22. Lower guide 62 extends rearwardly to coin collection slot 64 in a floor 66 of housing 14. A coin collection box 68 is disposed in a chamber 70 below coin collection slot 64. Front panel members 16a-c further form a coin return slot 72 with a coin return chute 74. Like coin insert slot 18, coin return slot 72 is angled or sloped to receive coins from disk 22 which is angled or tilted as shown in FIG. 2.

Figure 4A:
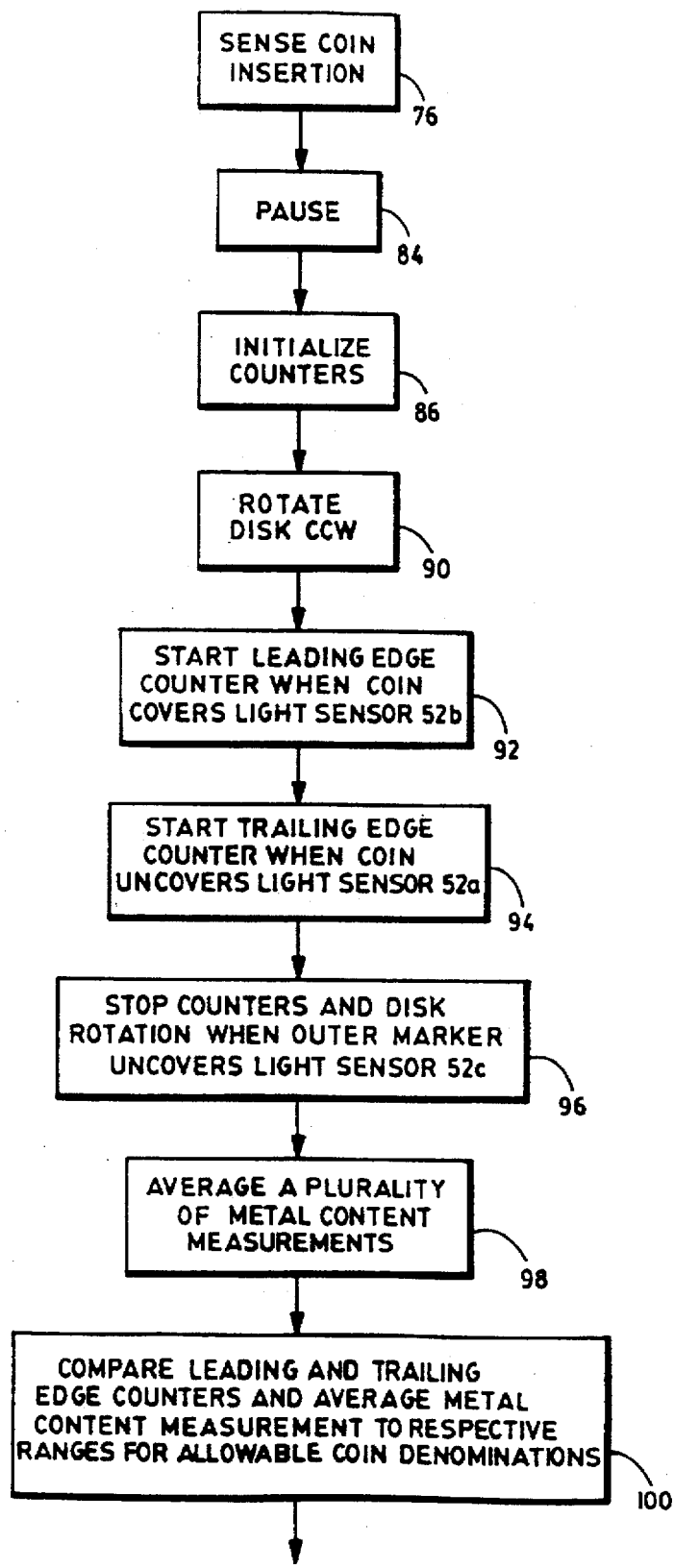
FIGS. 4A and 4B show a flow diagram depicting the operation of the coin discrimination and collection system.
Figure 5:
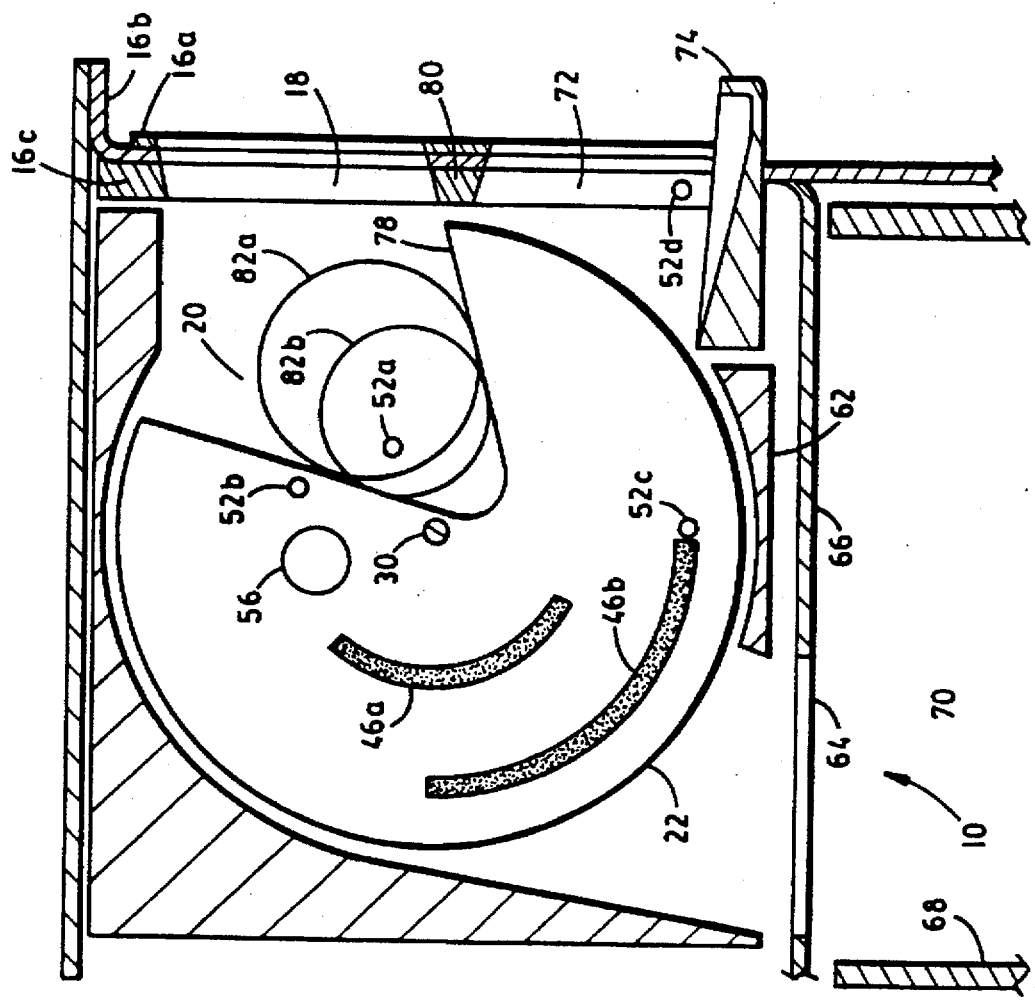
FIG. 5 is a side view of the coin transport mechanism after a coin has been received.

Referring to FIGS. 4A and B, the first step 76 in operation is to SENSE COIN INSERTION. Step 76 is performed using light sensor 52a as shown in FIG. 5. In particular, coin notch 20 is initially disposed to position edge 78 in alignment with the bottom 80 of coin insert slot 18, and light sensor 52a is disposed to transmit light from LED 48a across coin notch 20 to activate photo detector 50a when a coin is not present in coin notch 20. When a coin 82a or b is inserted by a user into coin insert slot 18, the coin 82a or b rolls down edge 78 and comes to rest in the nadir of notch 20 as shown in FIG. 5. Two coins 82a and b of different sizes or diameters are illustrated in FIG. 5 to show that light sensor 52a is disposed to be activated by coins of different sizes. In particular, a coin 82a or b breaks the light from LED 48a to photodetector 50a, and the change in state is interpreted by processor 54 to be that a coin 82a or b of unknown diameter has been inserted.

As shown in FIG. 4A, step 84 is to take a short PAUSE to permit the coin 82a or b to stop bouncing, and come to complete rest within coin notch 20 or pocket. Then, in step 86, processor 54 will INITIALIZE COUNTERS 88a and b. That is, leading and trailing edge time counters 88a and b as shown in FIG. 3 are reset to zero. As indicated by step 90, processor 54 then outputs 600 pulses per second on line output 58 to ROTATE DISK 22 CCW as referenced to FIG. 5. More specifically, while lower and upper plates 24a and b and embedded light sensors 52a-d remain stationary, disk 22 carrying coin 82a or b in coin notch 20 starts to rotate counterclockwise at a very uniform angular velocity.

As indicated by step 92, processor 54 will START LEADING EDGE COUNTER 88a WHEN COIN COVERS LIGHT SENSOR 52b. In particular, wheel or disk 22 is made of a transparent material that permits light to be transmitted therethrough, so light from LED 48b activates photodetector 50b until the leading edge of a coin interrupts it. As shown by FIGS. 6A and 6B, the angular orientation of disk 22 when the leading edge of a coin arrives at light sensor 52b is a function of the size or diameter of the coin in notch 20. In particular, in FIG. 6A, coin 82a is relatively large, and the leading edge is detected by a change in state of photodetector 50b after only a relatively small rotation from the initial position as shown in FIG. 5. However, in FIG. 6B, coin 82b is relatively small and rests further down into the nadir of notch 20 thus permitting rotation of disk 22 through a larger angle before coin 82b breaks the transmission of light from LED 48b to photodetector 50b.

Referring to step 94 of FIG. 4A, processor 54 will then START TRAILING EDGE COUNTER 88b WHEN COIN UNCOVERS LIGHT SENSOR 52a. For example, as can be seen from FIGS. 6A and 6B, respective coins 82a and b cover light sensors 52a, and a separate trailing edge counter 88b is started when disk 22 rotates to an angular orientation where coins 82a or b no longer break the light path. As can be readily understood, the angular orientation of disk 22 when this occurs is also a function of the size, and more particularly the diameter, of the coin 82a or b in coin notch 20.

Figure 7:
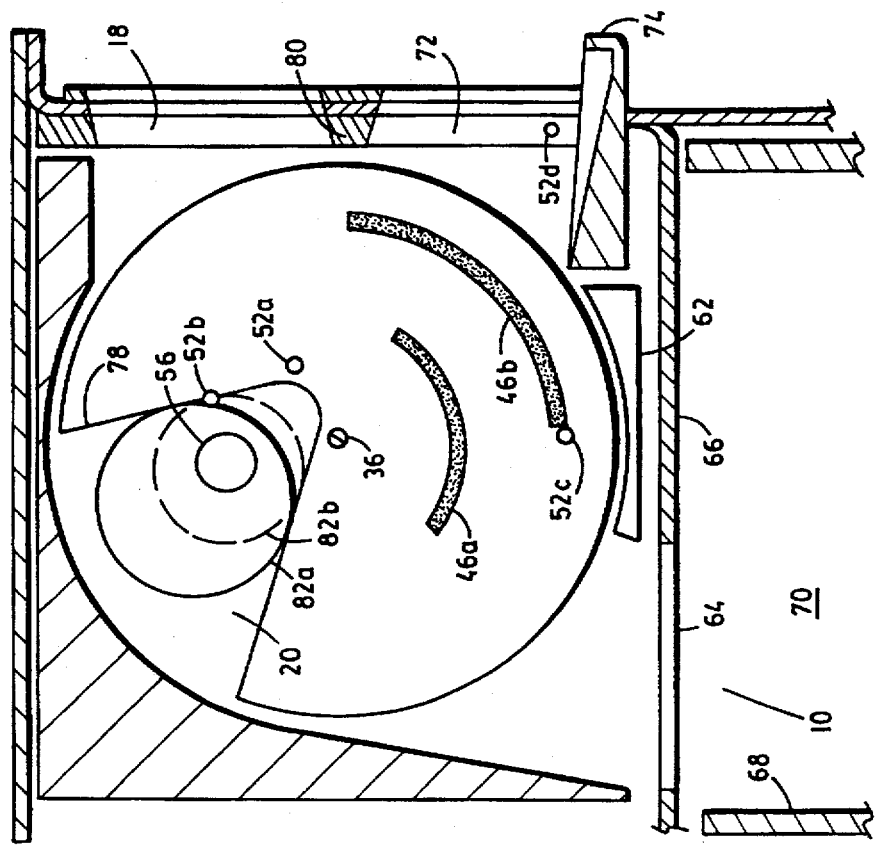
FIG. 7 shows the disk rotated to a coin evaluation orientation.

Referring again to FIG. 5, the initial angular orientation of disk 22 was determined by one end of outer marker 46b being aligned with light sensor 52c as shown. As indicated by step 96 of FIG. 4A, processor 54 will STOP COUNTERS 88a and b AND DISK 22 ROTATION WHEN OUTER MARKER 46b UNCOVERS LIGHT SENSOR 52c. Outer marker 46b is here an arcuate mask of 90°, so disk rotates 90° to the angular orientation shown in FIG. 7, at which time counters 88a and b are stopped. Thus, the contents of time counters 88a and b are elapsed time counts of the respective times to rotate disk 22 from respective positions or angular orientations where the leading and trailing edges of the coin 82a or b intersect light sensors 52a and b to a reference position, here 90° from the initial angular orientation. As described heretofore, the angular velocity of rotation is very uniform because it is accurately controlled by motor 42 at 0.6° per high frequency pulse from processor 54, so the counts in counters 88a and b also accurately represent the respective angular orientations of disk 22 when the leading and trailing edges of the coin 82a or b arrive at or intersect respective light sensors 52a and b. Furthermore, the angular orientation of disk 22 when leading and trailing edges of coin 82a or b intersect respective light sensors 52a and b is a function of the size, or more particularly the diameter, of coin 82a or b. Thus, the respective elapsed time counts in leading and trailing edge counters 88a and b accurately represent or correspond to the diameters of the coin 82a or b in coin notch 20 of disk 22. For example, with 600 pulses per second and each pulse rotating wheel 22 through an arc of 0.6°, wheel 22 would rotate at 1 revolution per second, or 0.25 seconds between the initial orientation as shown in FIG. 5 and the reference or evaluation orientation as shown in FIG. 7. In one operative embodiment, light sensor 52b may be positioned such that it is intersected by the leading edge of a dime at 143 milliseconds into the movement between orientations of FIG. 5 and FIG. 7, so the elapsed time count in leading edge counter 88a would be 107 milliseconds which, as described heretofore, corresponds to the diameter of the dime. In a similar manner, light sensor 52a may be positioned such that it is intersected by the trailing edge of a dime at 183 milliseconds into the movement, so trailing edge counter 88b would be 67 milliseconds. Likewise, typical counts in leading and trailing edge counters 88a and b for a nickel may be 140 and 87 milliseconds, respectively, and typical counts for a quarter may be 187 and 117 milliseconds, respectively. As will be described later herein, the actual measured times which correspond to the diameter of the coin 82a or b are compared to a known or standard range of acceptable times for each denomination of coin in use.

Although the use of elapsed time counters 88a and b has been described, those of skill in the art will recognize that there are other ways to provide signals indicative of the angular orientation of disk 22 at the time the leading and trailing edges of a coin 82a or b arrive at the light sensors 52a and b. For example, a mechanical resolver could be used to obtain angular orientation measurements. Also, rather than operating to a reference point, here the angular orientation of FIG. 7, a counter could be started by a leading edge and stopped by a trailing edge.

As indicated by step 98 of FIG. 4A, processor 54 will next AVERAGE A PLURALITY OF METAL CONTENT MEASUREMENTS, and store the result in metal content measurement register 99 (FIG. 3). As can be seen from FIG. 7, metal sensor 56 is positioned to be covered or adjacent to any sized coin 82a or b after disk 22 has been rotated through a predetermined angle, here 90°, from the initial orientation. Disk 22 and lower plate 24a are sloped or angled as shown best in FIG. 2 so coin 82a or b will be substantially flush against or parallel to metal sensor 56. Metal sensor 56 is a conventional metal content sensor such as one that positions the coin 82a or b in an inductive field of a coil in a circuit (not shown), and measures the coin's effect on the frequency, phase, or amplitude of the circuit's output. As is well known, the change in the measured parameter is, in part, a function of the metal content of the coin 82a. In contrast with prior art metal sensors techniques where the coin is rolled through the field, coin 82a is here stationary when a metal measurement is conducted. Thus, irregularities or inconsistencies caused by motion of the coin 82a are eliminated. Further, because disk 22 is accurately positioned by the end of marker 46b and light sensor 52c, approximately the same relationship always exits between the metal sensor 56 such as an inductor coil and coins 82a or b of a particular denomination.

As indicated by step 100 in FIG. 4A, processor 54 will then COMPARE LEADING AND TRAILING EDGE COUNTERS 88a and b AND AVERAGE METAL CONTENT MEASUREMENT TO RESPECTIVE RANGES FOR ALLOWABLE COIN DENOMINATIONS. There may be a variety of reasons why coins of the same denomination may result in slightly different leading and trailing edge measurements, and also different metal content measurements. For example, with respect to measured times, there may be slight variations in the alignment of or how the light sensors 52a and b are switched from one state to the other, or where the disk 22 is stopped by lower marker 46b and light sensor 52c. Further, there may be slight variations in the angular velocity of disk 22, or even in the diameters of like coins. With respect to metal content measurements, circuit parameters may vary, or coins may be worn or dirty, or may even have slightly different metal contents. In order to allow for variances in these parameters and others, acceptable ranges are formulated for each coin denomination that is allowed. These ranges may generally be formulated by sampling the measured leading and trailing edges times for a large number of coins of like denomination under a variety of conditions using different coin transport mechanisms 10. From this data, acceptable ranges may be determined using conventional statistical principles. For example, the range for leading and trailing edge counter times may typically be plus or minus 0.5 or 1 millisecond from the times given above for various denominations. In short, established limits of acceptability may generally be determined and stored such as in a look-up table for comparison with real time measurements of coin characteristics.

Figure 4B:
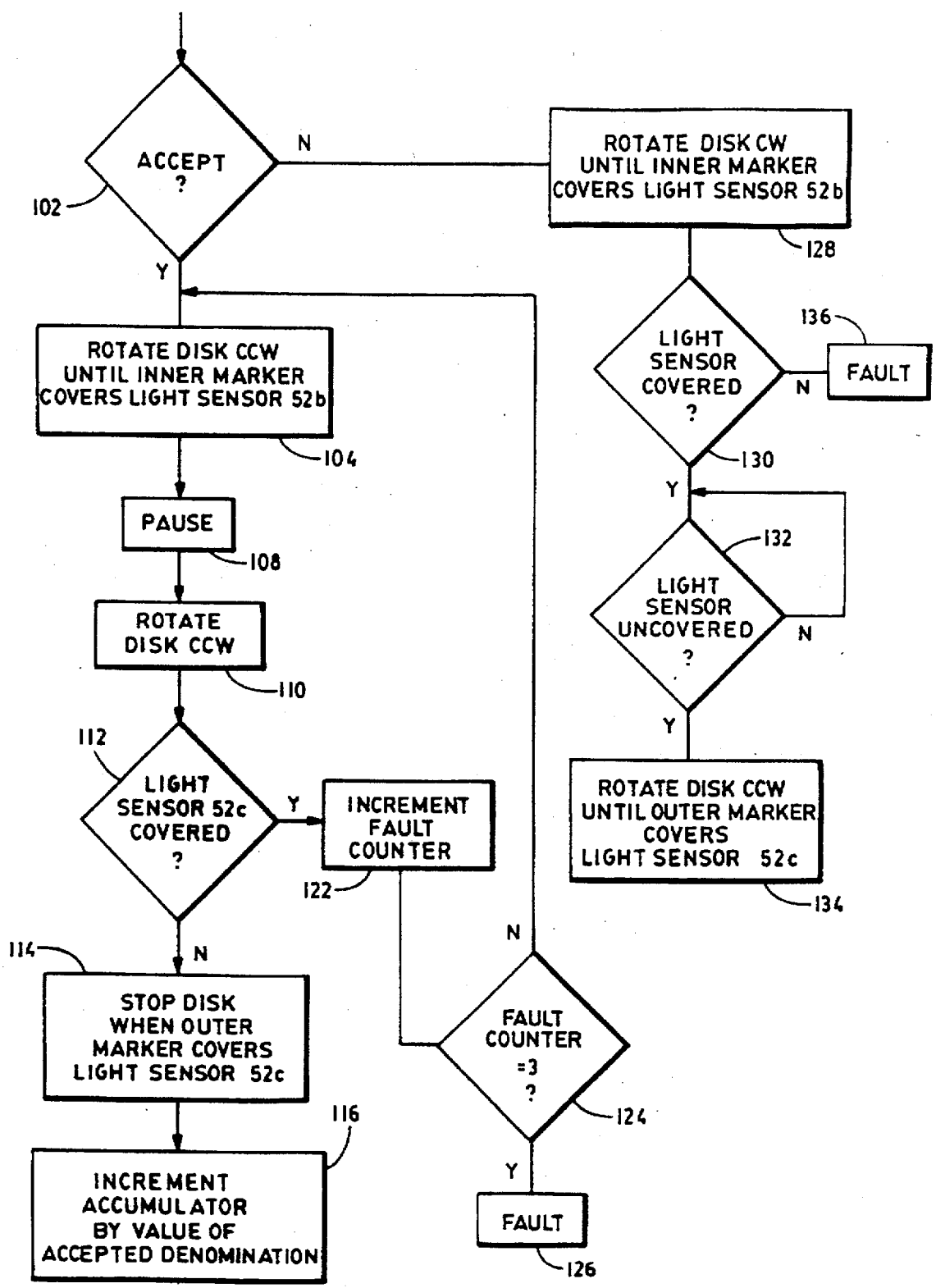

As indicated by step 102 as shown in FIG. 4B, processor 54 will then determine whether to ACCEPT ? or reject the coin 82a or b at the evaluation position shown in FIG. 7. Although a variety of algorithms may be used, processor 54 here merely determines if the stored elapsed time counts of the leading and trailing edge counters 88a and b are in the respective preprogrammed ranges for these parameters, and if the average metal content measurement falls in its preprogrammed range. If all three conditions are satisfied for a particular denomination of coin, the coin 82a or b is accepted for that denomination; and if any of the three conditions is not met for a particular denomination of coin, the coin 82a or b is rejected.

Figure 8:
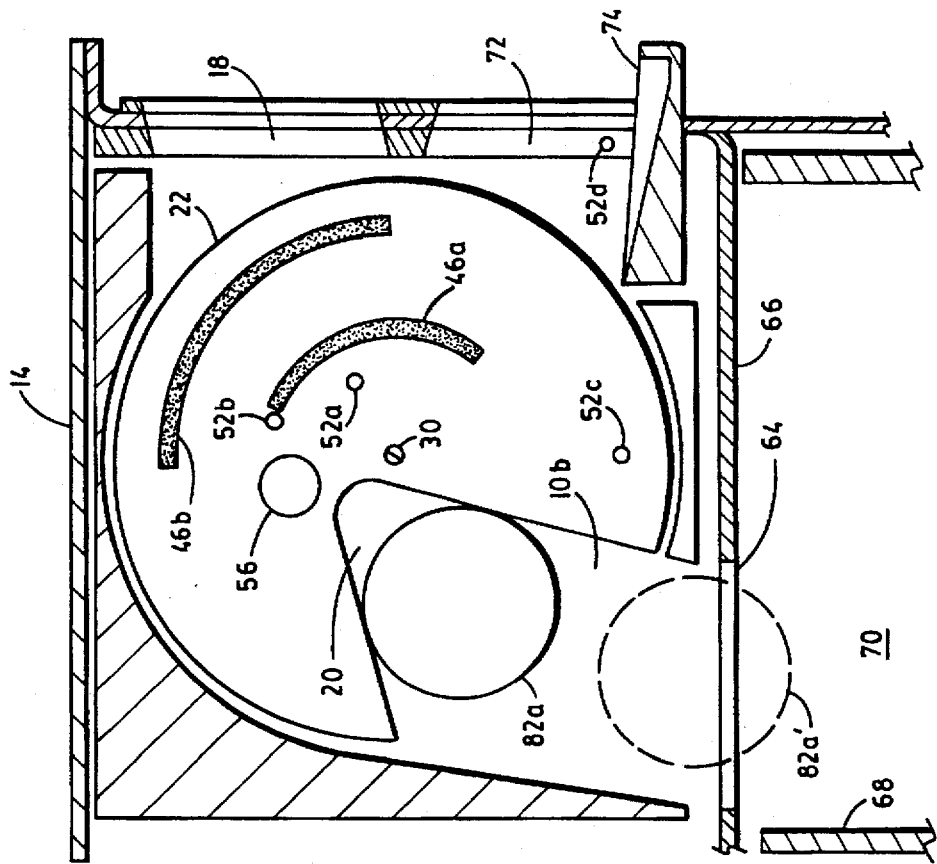
FIG. 8 shows the disk rotated to a coin collection orientation.

If the coin matches the parameters or characteristics (i.e. falls in the three ranges) of a particular coin denomination, processor 54 will ROTATE DISK 22 CCW UNTIL INNER MARKER 46a COVERS LIGHT SENSOR 52b as indicated by step 104 in FIG. 4B. More specifically, as shown in FIG. 8, disk 22 is rotated counterclockwise, here approximately 90°, to position the opening 106 of notch 20 facing downwardly above coin collection slot 64. In such position, processor 54 stops disk 22, and the coin 82a which has been accepted, falls to position 82a' down through coin collection slot 64 into coin collection box 68. After a suitable PAUSE as shown by step 108, processor 54 will ROTATE DISK 22 CCW as indicated by step 110.

As shown in FIG. 8, light sensor 52c is disposed to sense a lower portion of disk 22 in the CCW path of coin notch 20 in FIG. 8 and the initial orientation shown in FIG. 1. During the rotation of disk 22 in a CCW direction back to the initial position, processor 54 monitors light sensor 52c to determine if LIGHT SENSOR 52c COVERED ? as indicated by step 112. That is, processor 54 monitors for a change of state caused by a nontransparent object passing between LED 48c and photodetector 50c. If there is no such state change, processor 54 will STOP DISK 22 WHEN OUTER MARKER 46b COVERS LIGHT SENSOR 52c as indicated by step 114. Simply stated, disk 22 is returned to its initial orientation ready for insertion of another coin, and processor 54 will INCREMENT ACCUMULATOR 118 BY VALUE OF ACCEPTED DENOMINATION as indicated by step 116 in FIG. 4B. As is readily understood, an accumulator 118 is used to total the value of coins inserted towards a final value that is sufficient to activate the controlled machine, whether it be laundry equipment or a vending machine or the like.

Still referring to FIG. 4B, if light sensor 52c is covered during the rotation of disk 22 back to the initial orientation as indicated by step 112, that is indicative that the accepted coin 82a or b is still present in the coin notch 20. For example, such condition may have existed because a sticky substance was deposited on the edge of coin 82a or b. Without step 112, the process beginning with step 76 would continue in a loop and accumulator 118 would continue to increment with the coin 82a or b being lodged in notch 20. However, if an accepted coin 82a or b is not collected through coin collection slot 64 and continues to be present in coin notch 20, processor 54 will INCREMENT FAULT COUNTER 120 as indicated by step 122. As indicated by step 124, processor 54 will determine if FAULT COUNTER=3? If not, processor 54 will repeat steps 104, 108, 110 and 112 to determine if the jammed coin 82a or b subsequently becomes dislodged and drops through coin collection slot 64. If the coin 82a or b remains lodged in coin notch 20 such that fault counter 120 increments to 3, processor 54 will enter a FAULT mode as indicated by step 126. Suitable action may be taken, but coin transport mechanism 10 would generally be inoperable until service is provided to remove coin 82a or b from coin notch 20. It is noted that light sensors may perform more than one function. For example, light sensor 52c is used in conjunction with marker 46b to angularly locate disk 22, and also operates to sense the presence of coins. In this respect, sensor 52c must be located in a manner that it can perform both functions for all acceptable sizes of coins.

Figure 9:
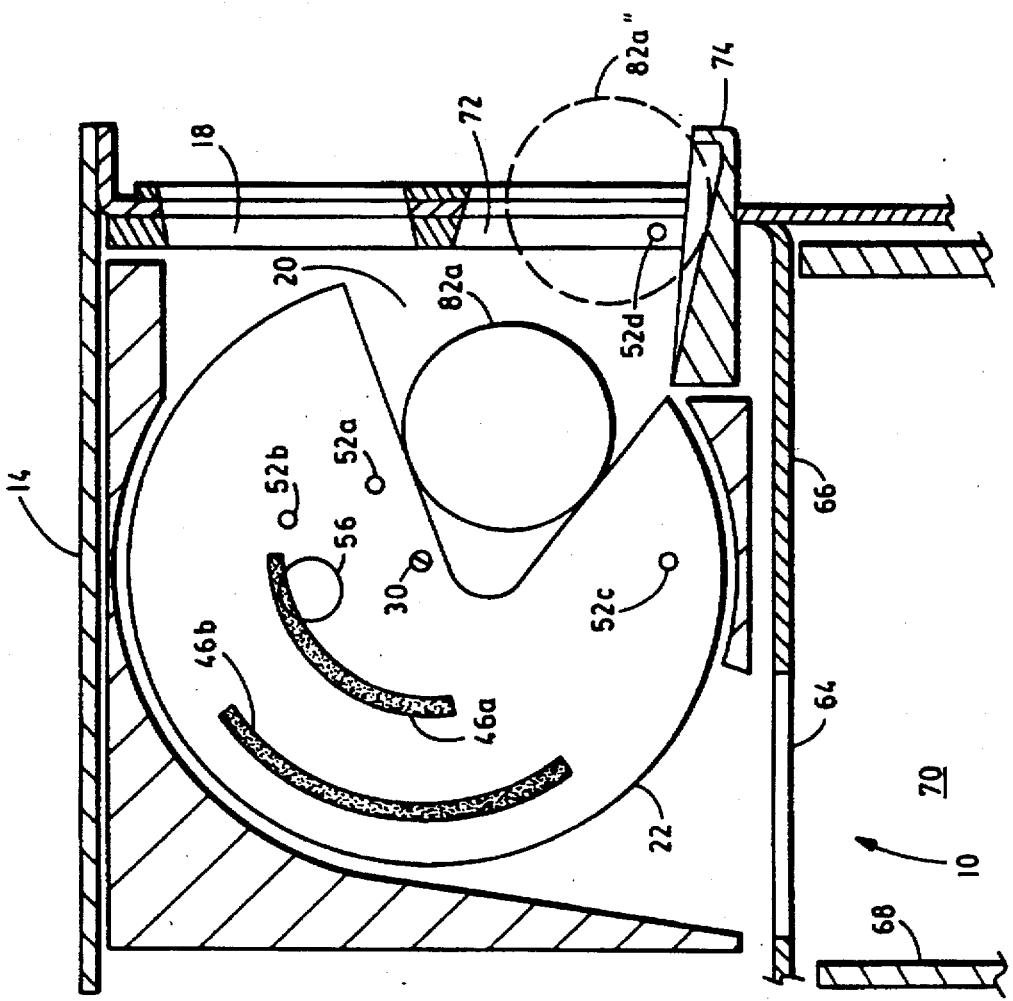
FIG. 9 shows the disk rotated to a coin return orientation.

Referring again to step 102, processor 54 will ROTATE DISK 22 CW UNTIL INNER MARKER 46a COVERS LIGHT SENSOR 52b as indicated by step 128 if the coin 82a or b is not accepted. Under such conditions, the disk 22 is rotated to the position shown in FIG. 9. Thus, the coin 82a is free to roll down edge 78 and coin return chute 74 through coin return slot 72 to position 82a". Light sensor 52d is disposed in coin return slot 72 as shown, and processor 54 will determine if LIGHT SENSOR 52d COVERED ? as indicated by step 130. If it is covered, that is indicative that the coin 82a has rolled out of coin notch 20 to coin return chute 74, and processor 54 will then determine if LIGHT SENSOR 52d UNCOVERED ? as indicated by step 132. Such change of state of light sensor 52d would indicate that the user has removed the coin 82a", in which case processor 54 will ROTATE DISK 22 CCW UNTIL OUTER MARKER COVERS LIGHT SENSOR 52c as indicated by step 134. In short, such action would return the disk 22 to its initial operating orientation ready for insertion of another coin.

Referring again to step 130, processor 54 would indicate a FAULT as shown by step 136 if the coin 82a was not sensed as being returned. Disk 22 will remain in this position until coin 82a or b is removed. As discussed above, such condition could indicate that the coin 82a is lodged in coin notch 20 in which case service may be required. Further, if the coin is not sensed as having been removed by the user in step 132, a loop will be executed until such action occurs.

Referring again to FIGS. 1 and 5–7, edge 78 of notch 20 is curved. In particular, edge 78 is the driving edge that pushes coin 82a or b through an arcuate path between the angular orientations of FIG. 1 and FIG. 7, and edge 78 is here shaped to be substantially perpendicular to the desired direction of coin travel. Thus, there is no force component due to tangential coin acceleration that pushes the coin 82a or b outward from the center of disk 22. Therefore, the coin 82a or b does not move in notch 20 when the disk 22 accelerates up to speed. Further, the angle or shape of edge 78 exceeds a minimum angle to provide an inward force component that offsets or counteracts the centripetal acceleration of the coin 82a or b up to a speed such as 60 R.P.M. Hence, when a coin 82a or b is accelerated up to speed or at steady state, the coin 82a or b does not move in notch 20. That is, coin 82a or b has a fixed relationship with respect to disk 22 during the portion of time when diameter is being discriminated, and the velocity of coin 82a or b is accurately controlled along a predetermined arcuate path from the orientation of FIG. 5 to the orientation of FIG. 7. The path passes light sensors 52a and b.

Figure 10:
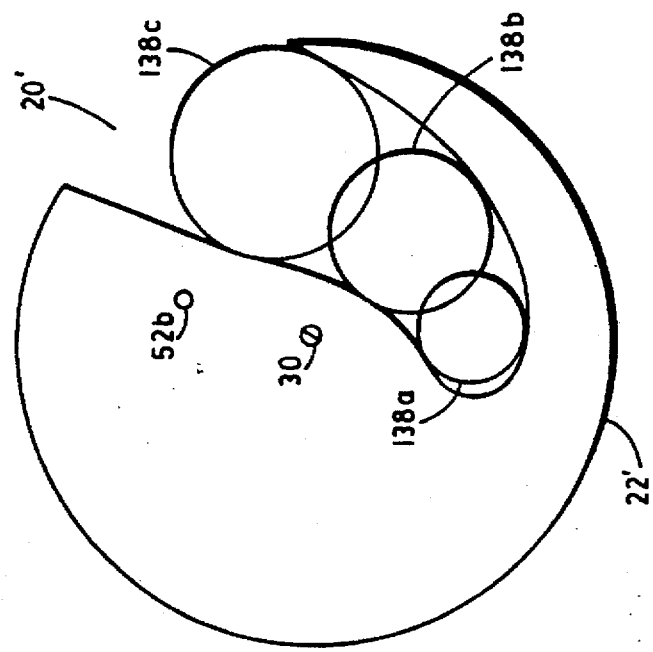
FIG. 10 shows an alternate embodiment for the disk.

The geometry or shape of notch 20 can also be selected to provide another advantage in diameter related measurements. In particular, see FIG. 5 and note that a center for a smaller coin 82b is located lower in the notch 20 than a larger coin 82a. This displacement difference contributes to the fact that the larger coin 82a arrives at light sensor 52b sooner than a small coin 82b when disk 22 is rotated. See FIGS. 6A and 6B for the respective angular orientations of leading edge arrival. The difference between these two angular orientations represents the diameter discrimination of coins. Referring now to FIG. 10, it can be seen that notch 20' is shaped such that a small coin 138a falls much further into the notch 20' than a larger coin 138b or c. Thus, there is a larger or increased angular difference between the arrival of a large coin 138c and a small coin 138a at light sensor 52b. Thus, a mechanical advantage in displacement of coins of different sizes within the notch 20' is provided. That is, there is nonlinear displacement of coins of different sizes within the notch 20' to amplify the difference between measurements of those sizes.

As described above, two coin diameter related measurements are made. The first measurement is stored in leading edge counter 88a, and is the elapsed time between the leading edge of the coin 82a or b intersecting or arriving at light sensor 52b and disk 22 arriving at the reference or evaluation orientation shown in FIG. 7. The second measurement is stored in trailing edge counter 88b, and is the elapsed time between the trailing edge of the coin 82a or b intersecting or arriving at light sensor 52a and disk 22 arriving at the reference or evaluation orientation shown in FIG. 7. It is noted that the reference point for stopping the counters 88a and b is the same for both measurements. Two diameter measurements may be more desirable than one because the leading edge measurement with light sensor 52b may tend to be more accurate for small diameter coins 82b, while the trailing edge measurement using light sensor 52a may tend to be more accurate for large coins 82a.

In summary, a number of advantages are provided by coin transport mechanism 10 and related apparatus and method. First, coin transport mechanism 10 carries a coin 82a or b at an accurately controlled velocity along a path where diameter related measurements are made without inconsistencies caused by a rolling coin. Also, coin transport mechanism 10 positions the coin 82a or b in a repeatable and accurately controlled stationary position adjacent to the metal sensor 56 so a plurality of accurate metal content measurements are made. Further, in all but the initial angular orientation of disk 22 as shown in FIG. 5, the periphery of disk 22 covers the coin insert slot 18 which prevents additional coins or implements from be inserted into and interfering with the coin evaluation process. Also, after a coin has been accepted because its characteristics match that of a known standard, the coin 82a or b is rotated so that the coin is collected. However, if the coin remains in notch 20 such as it might if a sticky substance had been placed on the coin 82a or b to cheat the system 12, that is detected by light sensor 52c, and no credit is given.

This completes the Description of the Preferred Embodiment. However, a reading of it by those skilled in the art will bring to mind many alterations and modifications that do not depart from the spirit and scope of the invention. Therefore, it is intended that the scope of the invention be limited only by the appended claims.

What is claimed is:

1. A coin diameter discriminating device comprising:
transport means comprising a disk for holding a received coin of unknown diameter;
means for rotating said disk to move the coin along a predetermined arcuate path at an accurately controlled velocity;
means for sensing an edge of the coin while the coin is being held by the transport means as the coin passes a predetermined point along said arcuate path at said accurately controlled velocity; and
means responsive to said sensor means for providing an output signal in accordance with the size of said coin, said output signal providing means comprising means for determining the angular orientation of said disk when said edge of said coin arrives at said sensing means.

2. The device recited in claim 1 wherein said disk has a notch for receiving said coin.

3. The device recited in claim 2 wherein said moving means comprises a motor for rotating said disk at a substantially constant predetermined angular velocity to move said coin in an arcuate path at a substantially constant velocity.

4. The device recited in claim 3 wherein said disk is transmissive to light and said sensing means comprises a stationary optical sensor having a light beam across the path of the coin.

5. The device recited in claim 1 wherein said reference event is said disk having rotated to a predetermined angular orientation.

6. A coin diameter discriminating device comprising:
a coin transporting member having a notch for holding a coin of unknown diameter in a fixed relationship with respect to said transporting member;
a motor for moving said coin transporting member to displace the coin at an accurately controlled velocity along a predetermined path;
means for detecting the arrival of an edge of the coin at a predetermined point along said path while the coin is being held in the notch of the transporting member; and
means responsive to said detecting means for providing an output signal in accordance with the diameter of the coin, said output signal providing means comprising means for providing an output signal in accordance with the angular orientation of said coin transporting member when said detecting means detects the arrival of said edge of the coin.

7. The coin diameter discriminating device recited in claim 6 wherein said motor comprises means for rotating said coin transporting member at an accurately controlled velocity.

8. The coin diameter discriminating device recited in claim 7 wherein said motor comprises a stepper motor, and said device further comprises a speed reducer coupled between said stepper motor and said coin transporting member.

9. The coin diameter discriminating device recited in claim 6 wherein said detecting means comprises a stationary optical sensor having a light emitter on one side of said coin transporting member and a light detector on an opposite side of said coin transporting member, said coin transporting member being transmissive to light.

10. A coin diameter discriminating device comprising:
a rotary transport member having a notch adapted for receiving a coin deposited in through a coin insert slot;
a motor for rotating said transport member to carry said coin at a substantially constant velocity along a predetermined arcuate path;
an optical sensor disposed along said arcuate path to provide a signal in response to an edge of said coin passing said sensor while said coin is being carried in said notch of said rotary transport member; and
a timer responsive to said optical sensor and a signal from a predetermined event for providing an elapsed time count corresponding to the diameter of said coin.

11. The coin diameter discriminating device recited in claim 10 further comprising a second optical sensor for providing said predetermined event signal in response to said transport member rotating to a predetermined angular orientation.

12. The coin diameter discriminating device recited in claim 11 comprising a marker arranged on said rotary transport member to activate a change of state of said second optical sensor to provide said predetermined event signal.

13. The coin diameter discriminating device recited in claim 11 further comprising a third optical sensor disposed along said arcuate path to provide a second signal in response to an opposite edge of said coin passing said third sensor, said device further comprising a second timer responsive to said third optical sensor for providing a second elapsed time count corresponding to the diameter of said coin.

14. The device recited in claim 10 wherein said notch of said transport member has at least one edge curved to provide mechanical advantage in displacement of coins of different sizes within said notch.

15. The coin diameter discriminating device recited in claim 10 wherein said notch comprises means for providing nonlinear displacement of coins of different sizes within said notch.

16. A coin diameter discriminating device comprising:

a light transmissive disk having a notch adapted to receive a coin of unknown diameter;

first and second stationary plates disposed on opposite sides of said disk, said first plate having at least one light emitter and said second plate having at least one photodetector aligned to receive light from said emitter and provide an output signal in accordance therewith;

a stepper motor with a speed reducer coupled to said disk to provide accurately regulated rotation of said disk between said first and second plates to carry said coin at an accurately regulated velocity in an arcuate path between said at least one light emitter and said at least one photodetector;

a counter initiated by a change in state of said photodetector in response to said coin passing between said light emitter and said photodetector; and means for stopping said counter at a predetermined angular orientation of said disk to produce a count in accordance with the diameter of said coin.

17. A method of discriminating the diameter of a coin, comprising the steps of:

receiving the coin of unknown diameter in a notch of a coin transport member;

moving the coin transport member to carry the coin at an accurately controlled velocity along a predetermined path;

providing a sensor signal when an edge of the coin arrives at a predetermined point along the path while the coin is being moved by the transport member; and meansuring elapsed time between an occurrence of said sensor signal and a reference event;

providing a signal corresponding to the diameter of the coin in response to said elapsed time.

* * * * *